United States Patent
Pirie et al.

(10) Patent No.: US 7,640,500 B2
(45) Date of Patent: Dec. 29, 2009

(54) SYSTEM AND METHOD FOR PREFLIGHTING DOCUMENTS

(75) Inventors: Brian Pirie, Ottawa (CA); Phil Armstrong, Lindfield (AU); Vincent Bujold, St-Quentin (CA)

(73) Assignee: Corel Corporation (CA)

( * ) Notice: Subject to any disclaimer, the term of this patent is extended or adjusted under 35 U.S.C. 154(b) by 398 days.

(21) Appl. No.: 10/217,898

(22) Filed: Aug. 13, 2002

(65) Prior Publication Data

US 2004/0034834 A1 Feb. 19, 2004

(30) Foreign Application Priority Data

Jul. 11, 2002 (CA) .................................. 2393196

(51) Int. Cl.
*G06F 17/00* (2006.01)
(52) U.S. Cl. ..................................... 715/274
(58) Field of Classification Search ................. 715/527, 715/530, 708, 714, 274; 714/48; 719/320, 719/317, 312
See application file for complete search history.

(56) References Cited

U.S. PATENT DOCUMENTS

| | | | |
|---|---|---|---|
| 5,815,717 A | 9/1998 | Stack | 395/705 |
| 5,963,641 A * | 10/1999 | Crandall et al. | 380/2 |
| 5,974,568 A | 10/1999 | McQueen | 714/38 |
| 6,026,362 A | 2/2000 | Kim et al. | 705/1 |
| 6,042,614 A | 3/2000 | Davidson et al. | 717/4 |
| 6,052,525 A | 4/2000 | Carlson et al. | 395/701 |
| 6,085,029 A | 7/2000 | Kolawa et al. | 395/183.14 |
| 6,125,377 A | 9/2000 | Razin | 707/531 |
| 6,151,687 A | 11/2000 | Claes | 714/39 |
| 6,182,243 B1 | 1/2001 | Berthe et al. | 714/38 |
| 6,236,463 B1 * | 5/2001 | Cyman et al. | 358/1.14 |
| 6,340,977 B1 * | 1/2002 | Lui et al. | 715/709 |
| 6,608,697 B1 * | 8/2003 | Schorr et al. | 358/1.15 |
| 2002/0116399 A1 * | 8/2002 | Camps et al. | 707/200 |
| 2003/0061357 A1 * | 3/2003 | Hertling et al. | 709/227 |

\* cited by examiner

*Primary Examiner*—Amelia Rutledge
(74) *Attorney, Agent, or Firm*—Hayes Soloway P.C.

(57) ABSTRACT

A preflight system for analysing an electronic document for possible problems is disclosed. The preflight system has one or more preflight clients and a preflight engine. Each preflight client is provided for an associated output component of the creation application and has testing code for testing one or more warnings relating to the associated output component. The preflight engine determines relevant preflight client, controls preflight process using the relevant preflight clients, and collects information on the test results of the warnings from the relevant preflight clients.

20 Claims, 4 Drawing Sheets

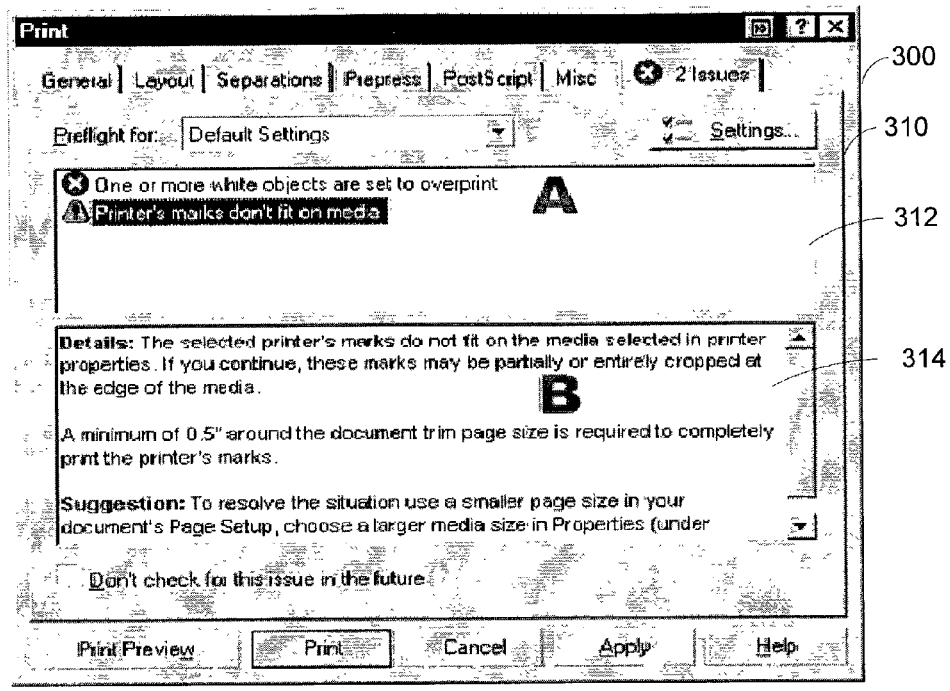
Figure 4
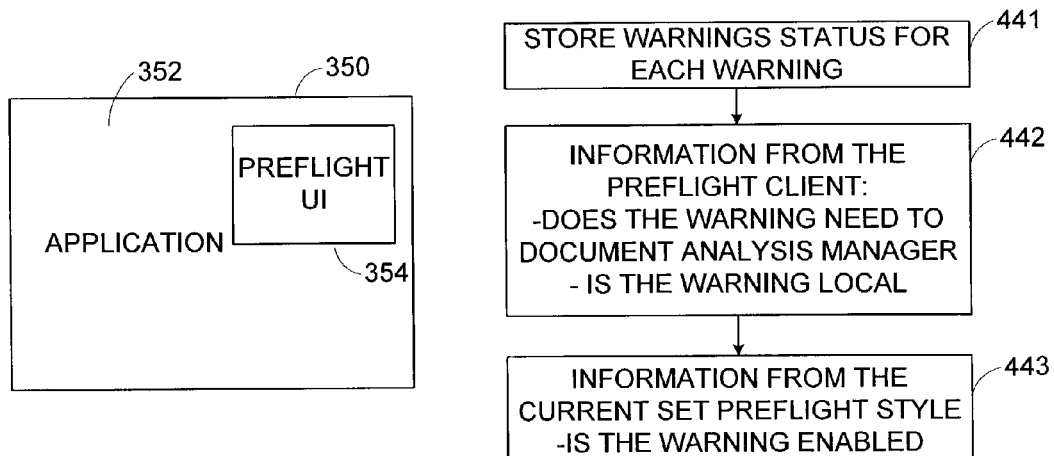
Figure 5
Figure 7

SYSTEM AND METHOD FOR PREFLIGHTING DOCUMENTS

This invention relates generally to the field of electronic document production, and more particularly, to a system and method for preflighting or "soft-proofing" of documents before outputting the documents to various destinations.

BACKGROUND OF THE INVENTION

There exist many document creation applications that allow users to create electronic documents with illustrations and/or images. When creating such an electronic document, inefficient or inexperienced use of the creation software can lead to problems when outputting, publishing or distributing the document. Some of those problems are not initially evident. For example, an illustration may use many "spot" colors that appear like any other color on the screen, but which require separate inks when printed on a press, consequently resulting in increased cost for unwanted printing plates.

Currently preflight software generally exists as an independent, stand-alone applications that analyze documents only after the documents have been output from the document creation software. This has a number of drawbacks such that the user is not alerted to problems until after he/she has gone through the process of outputting the document, which may be time consuming. If any issues are identified and require correction, the user must return to the creation software, make the necessary changes, and then repeat the output process. If the user could be notified of issues while working in the creation software, time and effort would be saved. Also, because information is generally lost in the process of outputting a document from the creation software, stand-alone preflight software does not have access to the intimate information regarding the problems, thus limiting its effectiveness.

Another mechanism commonly used to alert users of possible problems, either as an alternative or compliment to stand-alone preflight software, are warning windows that appear in the creation application. Such windows appear as secondary dialog boxes that require the user to respond before continuing in the creation application. While such warnings address the problems described above, they have their own drawbacks. First, the information is not presented to the user in any centralized, organized fashion. Secondly, such warnings are often seen by users as disruptive. When possible, users often turn off such warnings to avoid the disruption, but as a result loose the benefit of the warnings.

It is therefore desirable to provide a mechanism which can provide better warnings to users.

SUMMARY OF THE INVENTION

It is an object of the invention to provide a novel system and method for preflighting documents that obviates or mitigates at least one of the disadvantages of existing systems.

The term "preflight" is used in connection with the present invention to refer to the process of analyzing a document for possible problems, and alerting the user of any issues that were identified. The term "preflight" most often applies to analyzing a document in the early stage of a workflow leading to printing on a commercial printing press, but the concept applies equally to other processes such as preparing a file to be published on the Internet or other networks.

The present invention uses a distributed mechanism that has preflight clients distributed in an application to test warnings, and a central preflight engine that controls the preflight process by the preflight clients and collect the test results from the preflight clients.

In accordance with an aspect of the present invention, there is provided a preflight system for analysing an electronic document for possible problems. The document is created using a creation application that has one or more output components for outputting the document. The preflight system comprises one or more preflight clients and a preflight engine. Each preflight client is provided for an associated output component of the creation application and has testing code for testing one or more warnings relating to the associated output component. The preflight engine is provided for determining which preflight client is relevant for an output component of interest, controlling preflight process using the relevant preflight clients, and collecting information on the test results of the warnings from the relevant preflight client.

In accordance with another aspect of the present invention, there is provided a method for analysing an electronic document for possible problems. The document is created using a creation application that has one or more output components for outputting the document. The method comprises steps of distributing one or more preflight clients, each preflight client relating to an output component of the creation application and having testing code for testing one or more warnings associated with the related output component; determining which preflight client is relevant for an output component of interest; performing preflight process using the relevant preflight client; collecting information on the test results of the warnings from the relevant preflight client; and presenting the information to a user.

In accordance with another aspect of the present invention, there is provided a computer readable medium storing the instructions and/or statements for use in the execution in a computer of the method for analysing an electronic document for possible problems.

In accordance with another aspect of the present invention, there is provided electronic signals for use in the execution in a computer of the method for analysing an electronic document for possible problems.

In accordance with another aspect of the present invention, there is provided a computer program product for use in the execution in a computer of a method for analysing an electronic document for possible problems. The document is created using a creation application that has one or more output components for outputting the document. The computer program product comprises a module for distributing one or more preflight clients, each preflight client relating to an output component of the creation application and having testing code for testing one or more warnings associated with the related output component; a module for determining which preflight client is relevant for an output component of interest; a module for performing preflight process using the relevant preflight client; collecting information on the test results of the warnings from the relevant preflight client; and a module for presenting the information to a user.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which:

FIG. 4 is a diagram showing an example of a screen short of a preflight user interface;

FIG. 5 is a block diagram showing another example of the preflight user interface;

FIG. 7 is a flowchart showing an example of storing information on warnings.

DETAILED DESCRIPTION OF THE PREFERRED EMBODIMENTS

Figure 1:
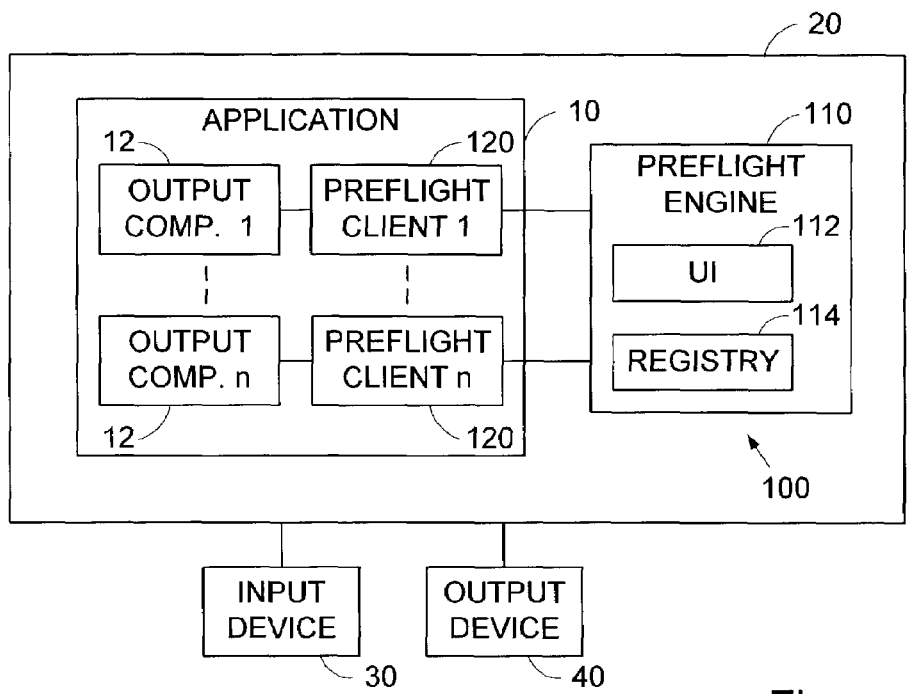
FIG. 1 is a block diagram showing a preflight system in accordance with an embodiment of the invention.

Referring to FIG. 1, a preflight system 100 in accordance with an embodiment of the present invention will be described.

The preflight system 100 is provided for soft-proofing of documents created by a creation application 10. The application 10 is installed in a computer 20 that uses one or more input devices 30 and one or more output devices 40. Input devices 30 may include a keyboard, mouse, touch screen and/or any device that accepts users input. Output devices 40 may include a printer, modem, export module, external storage and/or any other device that allows data output.

The application 10 has one or more output components or modules 12 to output documents or files. For example, an output component 12 may be a print engine, Portable Document Format (PDF) export module, Hyper Text Markup Language (HTML) export module, Scalable Vector Graphics (SVG) export module, Shockwave File Extension (SWF) export module, or other export module.

The preflight system 100 comprises a central preflight engine 110 and one or more preflight clients 120.

The preflight engine 110 provides a centralized mechanism for controlling the preflight process and collecting information on problems that are identified. It communicates with individual preflight clients 120, and informs them when to test for warnings. The preflight engine 110 has a presentation user interface 112, such as a Graphical User Interface (GUI), to inform the end users of the results of the preflighting process.

By providing the central preflight engine 110, preflight capabilities are effectively integrated into the application 10.

Preflight clients 120 are implemented outside the preflight engine 110. Preflight clients 120 are distributed in the application 10 to reside inside or closely associated with various output components 12 of the application 10 for which the preflight engine 110 collects information of potential problems. Each preflight client 120 has testing code that tests individual warnings of the associated output component 12. This allows the testing code to be localized to the area in the application 10 where the testing code has direct access to information relevant to the warning. For example, printing problems are tested within the print component 12, allowing for warnings to be tested based on specific print settings and information which may not be available outside of the print component 12. Thus, the testing can be carried out based on the native document format, and therefore, the preflight client does not have to assume as to what is and is not a problem and less problems are missed. Also, since the preflight clients 120 are built into the application 10, it can provide remedies to problems in a more accurate way.

Distribution of the preflight clients 120 may be implemented by building the preflight clients 12 into the particular Dynamic Link Library (DLL) of the output components 12 for which the preflight clients 120 check warnings. For example, the PDF and print engine DLLs may be built such that they have a subsection of code whose purpose is to act as their particular preflight clients.

Each preflight client 120 is treated as an independent component that may or may not be actually present. The implementation of preflight clients 120 allows the testing code to be distributed throughout the application 10.

The preflight system 100 having the above described central preflight engine 110 and distributed preflight clients 120 allows the testing code to be implemented in the portion of the code that has direct access to the relevant information, while allowing identified problems to be displayed to the user together in a single presentation user interface 112. This architecture simplifies the software, and provides access to information to which existing stand-alone preflight software would not have access.

Figure 2:
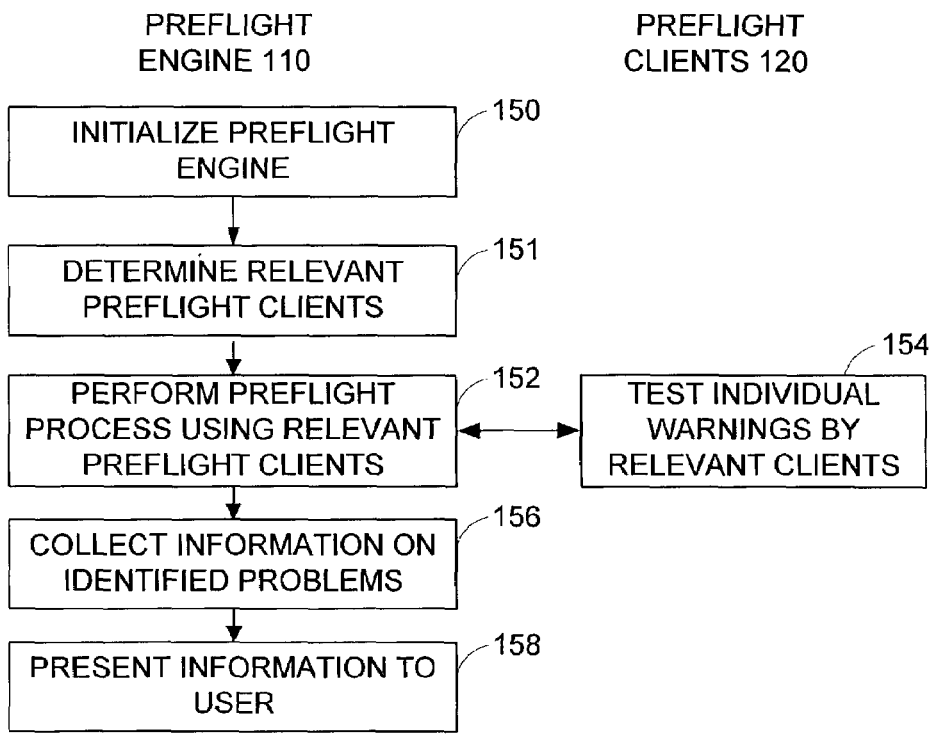
FIG. 2 is a flowchart showing an operation of the preflight system.

The operation of the preflight system 100 is now described referring to FIG. 2. The preflight engine 110 is initialized (150). The preflight engine 110 is typically initialized by the application 10 when its associated output component 12 is invoked. It may be initialized by a user directly.

The preflight engine 110 determines which preflight client or clients 120 are relevant to one or more output devices of interest (151). The user may designate in advance which output device or devices he/she intends to use. The preflight engine 110 performs the preflight process using the relevant preflight clients 120 (152). That is, the preflight engine 110 requests each relevant preflight client 120 to provide the test result or status of each warning for which the preflight client 120 is responsible to test. In response to this request, the relevant preflight clients 120 test their individual warnings (154). The preflight engine 110 collects the information on the test results of the warnings from the relevant preflight clients 120 (156). The relevant preflight clients 120 may provide to the preflight engine 110, as the test results of the warnings, the status of all warnings, or only those warnings that are triggered, i.e., warnings whose corresponding problems are identified. The preflight engine 110 presents the test results information to the user (158).

The distributed preflight client architecture allows users to tailor warnings. For example, if the end user desires, it may be tailored to only tell of printing problems when printing, and web problems when publishing to HTML. This architecture also allows implementation of new warnings with a minimum or a little effort. Because the warnings associated with the relevant output devices may be checked in a single pass of the preflight process, new warnings also have a minimum or a little impact on performance.

Referring back to FIG. 1, in this embodiment, each preflight client 120 is registered in a registry 114. The registry 114 may be dedicated to the preflight engine 110 as shown, or the preflight system 100 may use a registry of the computer 20 for this purpose.

The registration of the preflight clients 120 may be carried out when the application 10 is installed in the computer 20 and/or when the preflight clients 120 are added. For each preflight client 120, a registry value is added to a registry 114. The registry value provides a flag for the preflight engine 110.

In this embodiment, a user selects one or more output devices 30. A predetermined action by the user to the selected output devices 30 invokes the preflight engine 110. When the preflight engine 110 is invoked and initialized, it scans the registry 114 to determine which registered preflight client or clients 120 are relevant to the selected output devices 30, and requests the relevant preflight clients 120 to test or enumerate their warnings. For example, if the user is in the print dialog and goes to the preflight tab, the preflight engine 110 finds a printer preflight client 120 in the registry 114. The preflight engine 110 creates an instance of the printer preflight client 120, and requests the printer preflight client 120 to test its warnings. The preflight engine 110 then receives the test results from the printer preflight client 120 and displays the results to the user. The user may be given options to see the status of all warnings or only those warnings that were triggered.

Thus, the preflight system 100 allows the information regarding warnings to be gathered automatically while the user works in the creation application 10. Accordingly, the extra time and effort of running auxiliary preflight software is avoided.

Figure 3:
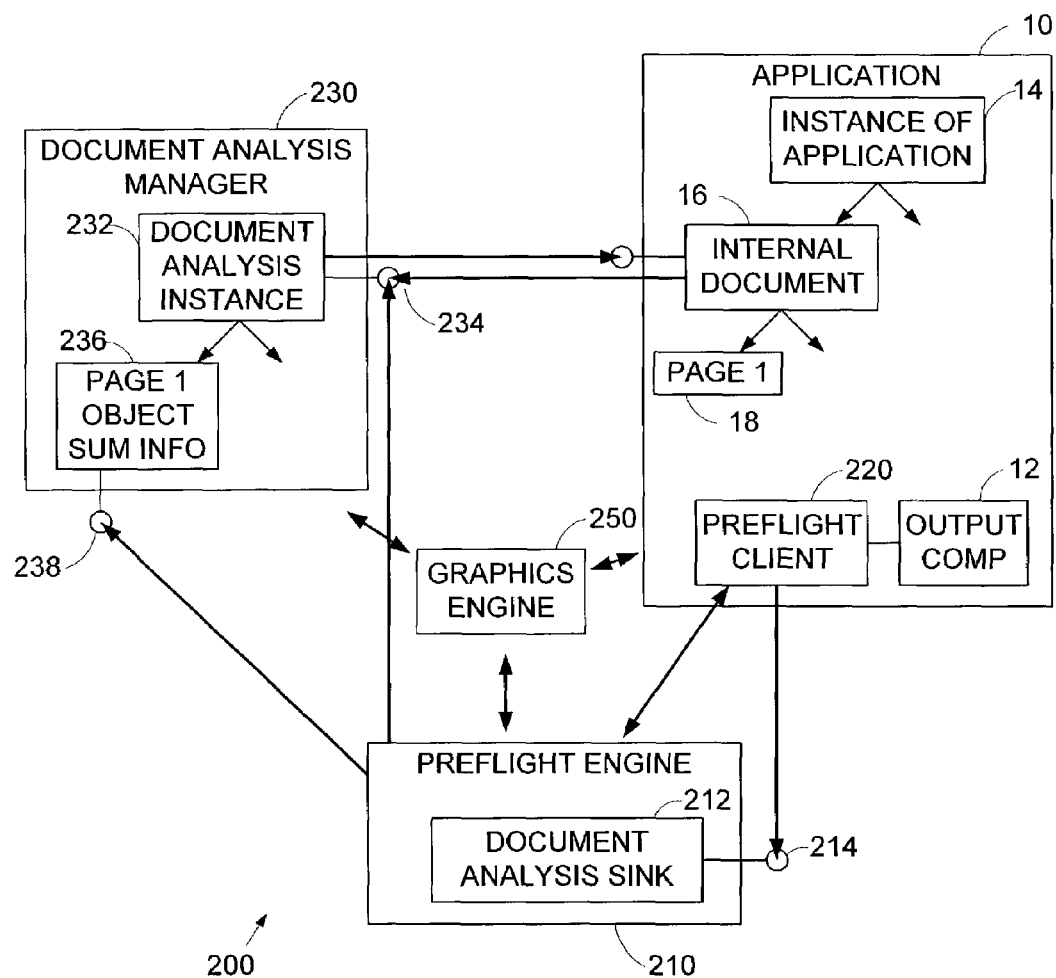
FIG. 3 is a block diagram showing a preflight system in accordance with another embodiment of the invention.

FIG. 3 shows another preflight system 200 in accordance with another embodiment of the invention. In this embodiment, preflight engine 210 uses a document analysis manager 210.

Testing some warnings requires specific information about a tested document that may not be necessary for testing other warnings by other preflight clients 220. For these warnings the individual preflight clients 220 perform specific resource counting that they required. The resource counting is analyzing of the document to look for a certain characteristic. Such examples may be two colors overlapping, or a specific font or color that may not work well on a web page.

However, generally, there is a lot of common information about a tested document that is needed among several preflight clients 220 to test several warnings. The document analysis manager 230 is a tool that is used to cache or store such common information about the document currently being preflighted. It gathers such information from the application 10 before any warnings are checked and exposes this gathered information to any warnings that wish to make use of it. This information would have to be calculated by each individual warning if it were not cached.

Examples of such common information include the general structure of a document, such as number of pages and their names, the count and bounding box of all objects on a page, and detailed summaries of the types of objects that exist, such as a list of fonts and characters, list of colors, list of external images or Open Pre-press Interface (OPI) images, and whether or not particular effects or fills are used.

As shown in FIG. 3, when a user initiates the application 10, an instance of the application 14 is created. When the user creates a document, internal document 16 of the application 10 is created. The document 16 may have one or more pages 18.

In response to the creation of the document 16 or when the preflight engine 210 determines that information from the document analysis manager 230 is needed, the document analysis manager 230 is launched. It creates a document analysis instance 232. Information about the document 16 is stored in this document analysis instance 232, and made accessible through its interface 234. Summary information about objects in each page is stored in corresponding object summary information sink 236, and made accessible through its interface 238.

The preflight engine 210 obtains the document analysis information from the document analysis manager 230 thorough the interfaces 234 and 238, and stores it in a document analysis sink 212 having an interface 214.

When a preflight client 220 needs the document analysis information to test a warning, it obtains the information from the preflight engine 210 through the interface 214. In a different embodiment, the preflight client 220 may obtain information directly from the document analysis manager 230.

In FIG. 3, only one preflight client 220 is shown, but there may be more than one preflight client provided for other output components of the application 10.

FIG. 3 also shows a graphics engine 250. The preflight engine 210 may use it for presenting the preflight information to users. The application 10 and the document analysis manager 230 may also use the same graphic engine 250. In that case, the document analysis manager 230 may request and receive data from the graphics engine 250 and the application 10 itself.

Warnings that can be tested by preflight clients 120, 220 may be broken into two categories: "simple warnings" and "object-based warnings" in view of the time it takes to check for them.

Simple warnings are those for which the preflight clients 120, 220 can instantly determine whether or not the problem exists, without having to examine each object in the document. This is typical of a warning that is displayed as a result of particular combination of settings, regardless of the contents of the document itself. For this type of warning, the preflight engine 110, 210 simply makes a single call to the preflight client 120, 220 to query whether or not the warning should be triggered.

As an example, a simple warning would be the color space of the document. When an output component, e.g., a flash, can only export in RGB, if the color space is CMYK, the preflight client that is provided for the output component would indicate to the preflight engine that there would be a problem. This type of check does not require the warning to check each individual object in the document.

Object-based warnings, on the other hand, are able to examine each and every object in the document to determine whether or not the warning applies to that object. The distributed design of the preflight engine allows all relevant objects in the document to be examined in a single pass, with each object being passed to those preflight clients that have object-based warnings.

An example of an object based warning would be overprinting of white. This warning requires that each individual object in the document be checked to ensure that none of them are set to overprint white.

A warning may be provided with a predetermined warning level indicating its severity. The warning level is determined by the implementor of the warning. For example, following three categories of warnings defined by their severity may be used:

1. The first level is just a reminder indicating something to the user, such as the color space of the document.
2. The second level of warning is a warning that could potentially cause problems but won't prevent the document from printing/exporting/etc. properly. An example of such a warning would be the presence of many different fonts in a document(this would lead to a final document with a bloated size and could potentially take longer to process into the final image or file.
3. The final warning level is triggered when something in the document will definitely pose a problem when creating a final image. For example, trying to overprint a white image on a white background is impossible.

When a warning is triggered, it will be presented to the user. The preflight engine 110, 210 may make additional calls to the preflight client 120, 220 to obtain information about the warning, such as the severity level of the warning and the text to be displayed. The warning and other information may be displayed in a GUI.

FIG. 4 shows an example of a GUI 300 which relates to a preflight client of a print engine. The GUI 300 can be displayed in a variety of containers. For example, it may appear as a page in a tabbed dialog box, such as a dialog box 310 used when printing or exporting a document. As the user makes changes, the image and text on the tab changes to alert the user when a possible problem has been identified. The GUI 300 presents a list of problems (A) in a first dialog box 312. When the user clicks on a problem in the list, further details on the problem are then displayed (B) in a second dialog box 330.

In addition to presenting preflight in dialog boxes such as those for print and export, the preflight system 100, 200 may permit on-the-fly preflighting. When the preflight system 100, 200 permits on-the-fly preflighting, the preflight engine 120, 210 makes it possible to have the preflight user interface continuously visible while the user is creating or editing the document.

FIG. 5 shows an example of application window 350 having an application portion 352 and a preflight portion 354. A document of the application is displayed in the application portion 352, and the preflight user interface is displayed in the preflight portion 354. The size and location of the preflight portion 354 may be determined or changed as desired.

As the user makes changes to the document displayed in the application portion 352, the preflight engine 110, 210 continues to process the document in a background thread, passing any newly modified portions of the document to the relevant preflight clients 120, 220. As a result, when the user makes a change to the document that could lead to difficulties later on, a new warning appears in the preflight portion 354 of the application window 350. The user can choose to pay attention to the warning immediately, or may continue to work without having to respond to any on-screen messages shown in the preflight user interface until such time as it is convenient for him or her to look at the warning.

To provide the on-the-fly preflighting, the preflight system 100, 200 may use a timer (not shown) that constantly updates the status of each warning that it checks. The timer is controlled by the preflight engine 110, 210. It may go off several times a second. When the timer fires, the preflight engine 110, 210 updates the status of relevant warnings in the manner as described above. The quick frequency of the timer and consequential updating of the status give the end user the appearance of an instantaneous, or on-the-fly, updating of the preflight information.

The preflight system 200 uses the document analysis manager 230 to update the status of relevant warnings frequently each second. Since the document analysis manager 230 holds document specific information that several warnings may need, it prevents the preflight engine 210 from recalculating this information for each warning which could become prohibitively expensive as the number of objects in a document increases. Thus, the document analysis manager 230 allows the preflight engine 220 to scan a document several times a second, giving the preflighting process a real time feeling. The real time aspect allows the user to make changes and instantaneously see any new errors that the preflight system 200 may report. This provides interactivity with the end user. Also, the on-the-fly preflighting institutes a learning process for the users so that they become more efficient themselves and need less preflighting in the future.

Figure 6:
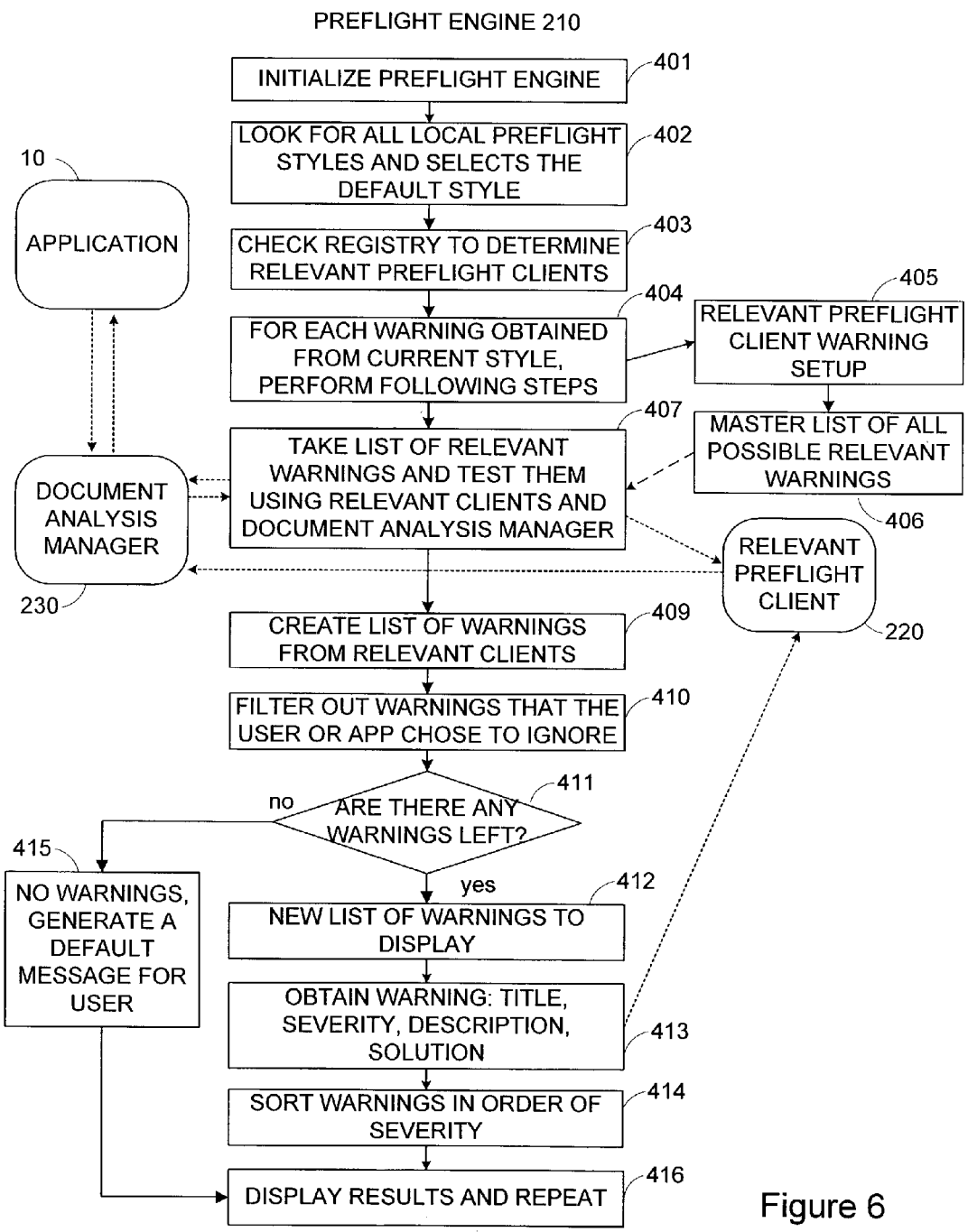
FIG. 6 is a flowchart showing another example of the operation of the preflight system.

FIG. 6 is a flow chart showing an example of the operation of a preflight system, similar to the system 200 shown in FIG. 3. Similar elements are shown using the same reference numbers, but a different suitable system and elements may be used.

The preflighting of a document begins when the user launches a dialog that includes an instance of the preflight engine 210. This initializes the preflight engine 210 (401). Each instance of the preflight engine 210 is tied to a particular preflight client 220 so that warnings of the particular preflight client 220 will be displayed.

The preflight client 220 in question is decided by the action that the user took to launch the preflight engine 210. For example, if the user launches the print dialog then the print engine's preflight client would be the client 210 whose warnings would be displayed.

On the initialization of the preflight engine 210, it looks for local preflight styles defining settings of preflight parameters. The preflight engine 210 selects a default style (402). Many different users may design their own styles that suit their own preferences. For example, a designer may need to design using many spot colors for a particular job and does not need to know that using many spot colors could be expensive to print. Such a designer may have a preflight style with a warning of many spot colors disabled.

The preflight engine 210 scans the registry looking for relevant installed and registered preflight clients 220 (403). It is the responsibility of these preflight clients 220 to register themselves in the registry. This is commonly done when the application 10 is first installed. Each client 220 is built into the individual output engine or module with which it represents. This design has the advantage of allowing each client 220 to more easily or quickly check its list of warnings by keeping the overhead of calling other DLL's down.

Once the preflight engine 210 has found out about relevant present preflight clients 220, it loads one or more preset files relating for each warning of the relevant preflight client 220 from the current style (404-406). These files contain a list of the warnings registered by the individual relevant preflight clients 220 along with a tag or other indication that tells the preflight engine 210 which warnings are turned on/off by default. The use of these files has benefits that these files can be customized by the user in such a way as to allow for different work flows to report different sets of warnings. Such a need of customization may arise when a pre-press designer is exporting a file to printed media, a PDF as well as another web medium.

The preflight engine 210 then asks the located relevant preflight clients 220 to enumerate their warnings (405) which are stored in a master list 406 by the preflight engine 210.

The preflight engine 210 records certain parameters about each warning (405). As shown in FIG. 7, items of interest about each warning that the preflight engine 210 stores include warnings status for each warning 441, information from the preflight client 442 and information from the current set preflight style 443.

Information from the relevant preflight client 442 includes if the warning requires the data stored in the document analysis manager 230; and if the warning is local.

Information from the current set preflight style 443 includes if the warning is enabled. The application or the user may turn a warning on or off. If it is turned off, the warning will not be checked for and will not be displayed by the preflight engine user interface.

From the information stored during the preflight client warning setup step 405, the preflight engine 210 determines if the document analysis manager 230 is needed. If one or more of the warnings does need to use the document analysis manager 230, then the preflight engine 210 instructs the document analysis manager 230 to obtain all necessary data from the application 10. This process is called as "sinking".

Referring back to FIG. 6, once the master list of warnings 406 has been developed, the preflight engine 210 loops through the warnings listed in the master list 406 for the relevant preflight clients (404, 407). That is, the preflight engine 210 takes the master list and instructs each relevant preflight client 220 to test their warnings that are enabled (407). If the warning needs to use the document analysis manager 230, as described above, the preflight engine 210 will create an interface to the document analysis manager 230 that may be used to obtain common information about the document from the application 10. In FIG. 6, arrows represent that the preflight engine 210 and the preflight client 220 obtain document information from the document analysis manager 230. The preflight client 220 may also obtain document information from the application 10 and/or through the preflight engine 210 as described above referring to FIG. 3.

When each relevant preflight client 220 has processed their warnings, the preflight engine 210 creates a list of warnings obtained from the relevant preflight clients 220 (409).

From this list, the preflight engine 210 filters the warnings, and takes out those warnings that the user and/or the application 10 chooses to ignore (410).

Once the preflight engine has removed all the extraneous warnings, it then determines if there are any warnings to display (411).

If there are no warnings for the preflight engine 210 to display (411), it generates a standard message (415) to inform the user that there are no detected problems with the current document. This message is then displayed to the user by the preflight engine's user interface (416).

If there are warnings to display (411), the warnings are put into an array (412) which will be the final list of warnings to display to the end user. The preflight engine 210 then queries the relevant preflight client 220 for the following information (413):

Title of the warning: This is the title that the user will see in the user interface. An example of this is shown in FIG. 4, Section A.

The Severity of the warning: There are 3 types of severity, a reminder, a possible problem and a definite problem. Each level of warning is displayed to the user in the form of an icon. An example of this is shown in FIG. 4, Section A as an icon beside the title Description: This description of the warning will provide the user with the reason why the warning is a problem, or could potentially become one. An example of the description is shown in FIG. 4, Section B under the heading "Details". Note that section B shows only one warning at a time and changes as the user browses through the existing warnings. In a different embodiment, multiple warnings may be displayed at a time.

A Solution: Each warning comes with a solution. The solution is displayed immediately following the description for the problem. An example of the solution is shown in FIG. 4, section B under the heading "Suggestion". As with the description, only one solution is shown at a time in this example, but in a different embodiment, multiple solutions may be displayed at a time.

With the warning information collected (413), the preflight engine 210 sorts all existing warning in order of severity, in order of definite problem, possible problems and then warnings (414).

With the warnings sorted, the preflight client displays these warnings to the user (416).

The preflight system of the present invention may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof.

The software code of the preflight system can be implementable by the creation application used to create documents. It may operate on various platform, such as the MAC, PC and Linux platform.

While particular embodiments of the present invention have been shown and described, changes and modifications may be made to such embodiments without departing from the true scope of the invention. For example, the elements of the connector unit are described separately, however, two or more elements may be provided as a single element, or one or more elements may be shared with other component in the computer systems.

What is claimed is:

1. A preflight system for analysing an electronic document for possible problems, the document being created using a creation application that has a plurality of output components for outputting the document, the preflight system comprising:

a plurality of preflight clients distributed within the document creation application to reside closely associated with the output components of the creation application, each preflight client being provided for an associated output component of the creation application and having testing code for testing one or more warnings relating to the associated output component, the testing code being implemented in a portion of the creation application that has direct access to relevant information of the associated output component for testing the warnings;

a registry to register the preflight clients and store a list of warnings that each of the preflight clients test; and a central preflight engine capable of communicating with the preflight clients, the preflight engine automatically determining based on the registry, among the preflight clients, one or more relevant preflight clients that are relevant for one or more selected output components which are to be used to output a document created by the creation application, centrally controlling preflight process on the document by using the relevant preflight clients which test the warnings within the creation application based on a native document format of the creation application prior to outputting the document from the creation application by the selected output components, and centrally collecting information on test results of the warnings from the relevant preflight clients for the selected output components prior to outputting the document from the creation application.

2. The preflight system as claimed in claim 1 wherein the preflight engine has a user interface for presenting the information to users.

3. The preflight system as claimed in claim 1 wherein the preflight engine updates the preflight process and collects updated information on the test results of the warnings from the relevant preflight client in a predetermined manner.

4. The preflight system as claimed in claim 3 wherein preflight engine has:

a timer to update the preflight process regularly in a preset time interval; and a user interface to present the updated information to users as it is updated so as to provide a real time preflight effect.

5. The preflight system as claimed in claim 4 wherein the user interface stays visible to the users during the creation of the document.

6. The preflight system as claimed in claim 1 further comprising a document analysis manager for storing document information about a document to be tested, and allowing the stored document information accessible by the preflight engine.

7. The preflight system as claimed in claim 6 wherein the document analysis manager allows the stored document information accessible to the preflight clients for testing warnings directly or through the preflight engine.

8. The preflight system as claimed in claim 1 wherein each preflight client is built in a Dynamic Link Library (DLL) of its associated output component for which the preflight client tests warnings.

9. A method for analysing an electronic document for possible problems, the document being created using a creation application that has a plurality of output components for outputting the document, the method comprising steps of:
distributing a plurality of preflight clients within the document creation application to reside closely associated with the output components of the creation application, each preflight client relating to an output component of the creation application and having testing code for testing one or more warnings associated with the related output component, the testing code being implemented in a portion of the creation application that has direct access to relevant information of the associated output component for testing the warnings;
registering the preflight clients in a registry with a list of warnings that each of the preflight clients test;
automatically determining based on the registry, among the preflight clients, one or more relevant preflight clients that are relevant for one or more selected output components which are to be used to output a document created by the creation application,
centrally controlling preflight process on the ground by using the relevant preflight clients which test the warnings of the relevant preflight clients within the creation application based on a native document format of the creation application prior to outputting the document from the creation application by the selected output components; centrally collecting information on test results of the warnings from the relevant preflight clients for the selected output components prior to outputting the document from the creation application; and
presenting the information to a user.

10. The method as claimed in claim 9 wherein the performing step comprises steps of:
caching document information about a document to be tested; and
providing the cached document information for testing one or more warnings by the relevant preflight client.

11. The method as claimed in claim 10 wherein the caching step caches the document information when one or more warnings need the document information.

12. The method as claimed in claim 9 wherein the performing step comprises a step of updating the preflight process by the relevant preflight client and collects updated information on the test results of the warnings in a predetermined manner.

13. The method as claimed in claim 12 wherein the updating step comprising steps of:
updating the preflight process by the relevant preflight client regularly in a preset time interval; and
presenting the updated information to users as it is updated so as to provide a real time effect.

14. The method as claimed in claim 13 wherein the presenting step presents the updated information continuously during the creation of the document.

15. The method as claimed in claim 9 wherein the distributing step comprises a step of distributing the preflight clients in the application by implementing the testing code in a portion of the application that has direct access to information relevant to the preflight process.

16. The method as claimed in claim 15 wherein the distributing step implements the testing code in a Dynamic Link Library (DLL) of an associated output component of the application.

17. The method as claimed in claim 9 wherein the presenting step displays a list of the identified problems.

18. The method as claimed in claim 17 wherein the displaying step displays a predetermined message relevant to the identified problems.

19. The method as claimed in claim 9 further comprising a step of allowing users to modify the warnings.

20. A computer readable medium storing the instructions and/or statements for use in the execution in a computer of a method for analysing an electronic document for possible problems, the document being created using a creation application that has a plurality of output components for outputting the document, the method comprising steps of:
distributing a plurality of preflight clients within the document creation application to reside closely associated with the output components of the creation application, each preflight client relating to an output component of the creation application and having testing code for testing one or more warnings associated with the related output component, the testing code being implemented in a portion of the creation application that has direct access to relevant information of the associated output component for testing the warnings;
registering the preflight clients in a registry with a list of warnings that each of the preflight clients test;
automatically determining based on the registry, among the preflight clients, one or more relevant preflight clients that are relevant for one or more selected output components which are to be used to output a document created by the creation application,
centrally controlling preflight process on the document by using the relevant preflight clients which test the warnings of the relevant preflight clients within the creation application based on a native document format of the creation application prior to outputting the document from the creator application by the selected output components;
centrally collecting information on test results of the warnings from the relevant preflight clients for the selected output components prior to outputting the document from the creation application; and
presenting the information to a user.

* * * * *

UNITED STATES PATENT AND TRADEMARK OFFICE
CERTIFICATE OF CORRECTION

| | | |
|---|---|---|
| PATENT NO. | : 7,640,500 B2 | Page 1 of 1 |
| APPLICATION NO. | : 10/217898 | |
| DATED | : December 29, 2009 | |
| INVENTOR(S) | : Pirie et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 690 days.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,640,500 B2 | Page 1 of 1 |
| APPLICATION NO. | : 10/217898 | |
| DATED | : December 29, 2009 | |
| INVENTOR(S) | : Pirie et al. | |

It is certified that error appears in the above-identified patent and that said Letters Patent is hereby corrected as shown below:

Claim 9, Col. 11, line 42 "the ground by" should be -- the document by --.

Signed and Sealed this
Thirteenth Day of March, 2012

David J. Kappos
*Director of the United States Patent and Trademark Office*